(12) United States Patent
Torsner et al.

(10) Patent No.: US 8,254,936 B2
(45) Date of Patent: Aug. 28, 2012

(54) METHOD, COMPUTER PROGRAM AND BASE STATION FOR PREDICTION BASED ALLOCATION OF PROCESSING RESOURCES IN A NON-SERVING BASE STATION

(75) Inventors: Per Johan Torsner, Masaby (FI); Mats Sågfors, Kyrkslätt (FI); Franz Heiser, Järfälla (SE); Stefan Parkval, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1125 days.

(21) Appl. No.: 12/091,954

(22) PCT Filed: Nov. 23, 2005

(86) PCT No.: PCT/SE2005/001755
§ 371 (c)(1),
(2), (4) Date: Apr. 29, 2008

(87) PCT Pub. No.: WO2007/061342
PCT Pub. Date: May 31, 2007

(65) Prior Publication Data
US 2008/0287132 A1    Nov. 20, 2008

(51) Int. Cl.
*H04W 36/00*    (2009.01)
*H04W 74/00*    (2009.01)

(52) U.S. Cl. ........................... 455/442; 455/450

(58) Field of Classification Search ............... 455/443, 455/442, 414.1, 440, 436, 115.1, 127.2, 70, 455/522, 69, 444, 67.11, 450, 115.2, 445, 455/446, 143, 515, 135, 452.2, 13.4, 524, 455/525; 370/318, 331, 335, 338, 252, 204, 370/510, 347, 465, 336, 337, 468, 477, 328, 370/251, 332, 329, 333, 237, 395.2, 395.4, 370/235, 216, 217, 218, 229, 238, 341, 342, 370/344
See application file for complete search history.

(56) References Cited

U.S. PATENT DOCUMENTS

| 7,286,801 | B2 * | 10/2007 | Amerga et al. | ............. 455/67.11 |
| 7,463,887 | B2 * | 12/2008 | Roberts et al. | ............. 455/435.2 |
| 7,768,983 | B2 * | 8/2010 | Nylander et al. | ............. 370/338 |
| 7,817,997 | B2 * | 10/2010 | Nylander et al. | ............. 455/422.1 |

(Continued)

FOREIGN PATENT DOCUMENTS

| EP | 1802161 B1 | 6/2007 |
| WO | WO 0038468 A1 | 6/2000 |

OTHER PUBLICATIONS

Siemens. Node B Resource Management in SHO. 3GPP Draft; R1-041361; $3^{rd}$ Generation Partnership Project (3GPP). Sophia-Antipolis Cedex, France. Nov. 12, 2004.

*Primary Examiner* — Melody Mehrpour

(57) ABSTRACT

The present invention relates to a base station and a method in a mobile telecommunication network for allocating and de-allocating uplink base station processing resources to a mobile terminal. The base station are adapted to communicate to a mobile terminal on an uplink channel supporting macro-diversity, and the base station is adapted to be a non-serving base-station without control of the resource allocation to the mobile-terminal. The base station comprises means for predicting a likelihood of successful decoding of a future transmission, and means for allocating or de-allocating processing resources based on said prediction.

32 Claims, 3 Drawing Sheets

---

Predict a likelihood of successful decoding of a future transmission.    301

↓

Allocate or de-allocate processing resources based on said prediction.    302

U.S. PATENT DOCUMENTS

| | | |
|---|---|---|
| 2003/0013454 A1 | 1/2003 | Hunzinger |
| 2003/0050084 A1* | 3/2003 | Damnjanovic et al. ........ 455/522 |
| 2004/0023622 A1* | 2/2004 | Mantha et al. ............. 455/115.1 |
| 2005/0037771 A1* | 2/2005 | Tiedemann et al. .......... 455/453 |
| 2005/0152308 A1* | 7/2005 | Seol et al. ..................... 370/328 |
| 2006/0146757 A1* | 7/2006 | Harris ........................... 370/335 |
| 2006/0268762 A1* | 11/2006 | Dominique et al. .......... 370/328 |
| 2009/0143070 A1* | 6/2009 | Shu et al. ..................... 455/450 |

* cited by examiner

| Predict a likelihood of successful decoding of a future transmission. | 301 |

↓

| Allocate or de-allocate processing resources based on said prediction. | 302 |

Fig. 3

METHOD, COMPUTER PROGRAM AND BASE STATION FOR PREDICTION BASED ALLOCATION OF PROCESSING RESOURCES IN A NON-SERVING BASE STATION

FIELD OF THE INVENTION

The present invention relates to arrangements in a mobile communication network. In particular, the present invention relates to arrangements for allocating processing resources in radio base station to be used for a mobile terminal in the uplink direction.

BACKGROUND OF THE INVENTION

The present invention concerns a base station in a mobile telecommunication access network such as the UMTS terrestrial radio access network (UTRAN). The UTRAN is illustrated in FIG. 1 and comprises at least one Radio Network System 100 connected to the Core Network (CN) 200. The CN is connectable to other networks such as the Internet, other mobile networks e.g. GSM systems and fixed telephony networks. The RNS 100 comprises at least one Radio Network Controller 110. Furthermore, the respective RNC 110 controls a plurality of Node-Bs 120,130 that are connected to the RNC by means of the Iub interface 140. Each Node B, also referred to as base station, covers one or more cells and is arranged to serve the User Equipment (UE) 300 within said cell. Finally, the UE 300, also referred to as mobile terminal, is connected to one or more Node Bs over the Wideband Code Division Multiple Access (WCDMA) based radio interface 150.

3GPP Release 6 has recently been updated with the "Enhanced Uplink" concept, which includes a new uplink transport channel, E-DCH. A new scheduler located in the Node B that performs transmission resource management based on the utilisation of the allocated radio resources is introduced as an alternative or complement to the existing packet scheduler located in the RNC. Combined with fast L1 HARQ schemes, the proposed algorithm can provide a cell throughput gain. Since the packet scheduler functionality is located in the Node B, a fast scheduling concept is introduced. Fast scheduling from the Node B denotes the possibility for the Node B to control when a UE is transmitting and at what data rate. The Node Bs can assign scheduling grants to the UEs, where these grants are based on both the transmission resource availability and the requested need for transmission resources, i.e. the scheduling requests from the UEs.

HARQ is a more advanced form of an ARQ retransmission scheme. In conventional ARQ schemes the receiver checks if a packet is received correctly. If it is not received correctly, the erroneous packet is discarded and a retransmission is requested. With HARQ the erroneous packet is not discarded. Instead the packet is kept and combined with a result of the retransmission. That implies that even if both the first transmission and the retransmission are erroneous, they may be combined to a correct packet. This means that fewer retransmissions are required.

On E-DCH the Node B scheduler has no direct information about the data that to be transmitted from the UEs. Thus the UEs are required to indicate the amount of data available, the priority of the data, the transmitter power available etc. to the Node B through scheduling requests. When the Node B has received the scheduling request from the UE and has decided to schedule the UE based on the received scheduling requests, it may transmit a grant, also denoted scheduling grant indicator herein, to the UE, indicating the amount of data or actually with which power the UE is allowed to transmit.

A particular aspect of relevance for the present invention is the fact that enhanced uplink, i.e. the E-DCH supports soft-handover. Soft-handover implies that a UE is connected to multiple base stations simultaneously. Thus, a UE in soft handover is power-controlled from multiple cells, and supported by data reception at multiple cells (i.e. macro diversity is utilized). Power control from multiple cells is needed to limit the inter-cell interference, while macro-diversity gains can be achieved by receiving data at multiple cells. FIG. 2 illustrates a scenario when a UE is in soft handover in a UMTS network as shown in FIG. 1. The network comprises base stations connected to a RNC 208, wherein the RNC 208 is further connected to a CN 210. The UE 202 is connected to the base stations 204 and 206 simultaneously.

In soft-handover in enhanced uplink, one cell is selected by the RNC to act as the Serving Cell, and the Node B in control of the Serving Cell is here denoted the Serving E-DCH Node B. The cells connected to the same UE is referred to as the E-DCH active set. The Serving E-DCH Node B controls the transmission resources of the UE, i.e. it is allowed to grant requested transmission resources. The Non-serving E-DCH Node Bs (i.e. Node Bs not in control of the serving cell) are not able to monitor the grants given by the E-DCH serving Node B and has thus no knowledge of the granted transmission resources. The Serving E-DCH Node B should typically be the Node B with the strongest uplink from the UE, but the E-DCH serving Node B may also be chosen differently. One alternative is to tie the E-DCH serving cell to the downlink HS-DSCH serving cell. Tying the E-DCH serving cell selection to the HS-DSCH serving cell may increase the likelihood that the strongest uplink in the active set is governed by a non-serving E-DCH Node B.

The present invention considers problems arising from such configuration that may result in that the uplink of the serving Node B is not the strongest link in the active set, i.e. another Node B of the active set receives the strongest signal from the UE in soft handover.

The E-DCH scheduling is mainly controlled from the serving E-DCH Node B, which can assign Absolute Grants (AG) to the UE's. These Absolute Grants limit the maximum transmission resources, e.g. power, the UE is allowed to use. Within this restriction, the final selection of data-rate is then performed by the UE itself, based on the data available in its buffers and on the available UE power. Alternatively, the serving E-DCH Node B can use Relative Grants to control the transmission rates of the UEs. The Relative Grants from the serving E-DCH cell can take three values: Up, Hold, and Down. However, the non serving Node Bs do not receive any information of limitations indicated by the absolute grant or relative grant from the serving E-DCH cell and is therefore not aware of the future processing resource need of the UE.

The scheduling control from non-serving E-DCH Node Bs is mainly intended for inter-cell interference suppression and system stability control. The Relative Grants that can be sent from the non-serving E-DCH Node Bs therefore take only two values: Hold and Down. With these relative grants, a Node B can reduce the interference contribution from UEs, which are not primarily controlled from this Node B.

Thus, the present invention deals with the processing resource allocation problem of the Node B that depends on that the non-serving Node Bs are not aware of the amount of transmission resources that is granted from the Node B controlling the serving cell.

From a Node B internal hardware allocation point of view, there is a significant difference between the serving E-DCH Node B and the non-serving Node Bs. The serving E-DCH Node B has information about the scheduling grant sent to the UE and therefore knowledge about the maximum amount of hardware resources needed for processing transmissions from this particular UE. However, a Node B that is not in control of the Serving E-DCH cell has much more limited means to predict the processing resources needed for the UE in question. This resource allocation problem is further complicated by the fact that the Node B processing resource allocation typically takes some time (e.g. 10-50 ms), meaning that a predictive processing resource allocation would be necessary to ensure that the reception of a transmission from a UE can be successfully completed.

Below are two existing solutions to this problem described:

According to a first example, processing resources are over-allocated and rate-limitation of terminals in soft handover may also occur. In this brute-force solution, sufficient Node B processing resources for the highest possible data rate are always allocated from the non-serving Node B. To reduce the need of hardware resources, the maximum bit rate of UEs in soft-handover may have to be limited.

According to a second example, the non-serving Node B could under-allocate processing resources, knowing that it may not be able to decode the first few Transmission Time Intervals (TTIs) of a UE transmission, in case the UE starts at a rate higher than estimated. Once the UE starts to transmit at a high data rate, the non-serving Node B can reallocate processing resources to this UE, assuming that it will continue to transmit for some time. Non-serving Node Bs may also try to listen to the scheduling requests from the UE to the serving cell to get some information about the amount of transmission resources the UE may need.

Both approaches are, however, equipped with obvious drawbacks:

The solution according to the first alternative may result in low utilization of available hardware resources, costly deployments with a necessity to deploy large pools of Node B processing resources and/or tight bit-rate restrictions for users in soft handover. This is neither desirable nor acceptable.

The opportunistic approach in the solution according to the second example may result in loss of the macro-diversity gain, since the first few HARQ transmission attempts at a non-serving Node B are lost. In addition, the second solution may interact with Outer-Loop Power-Control, which typically is operated on the number of HARQ transmissions. An increase in the number of HARQ transmissions due to hardware limitations may result in an unnecessary increase in the uplink SIR target with a capacity loss as a consequence.

SUMMARY OF THE INVENTION

Thus the object of the present invention is to achieve a method and arrangements for allocating base station processing resources for a mobile terminal in the uplink direction when the radio base station is not aware of the granted transmission resources of that mobile terminal.

This object is achieved by the method and arrangements defined by the independent claims.

Preferred embodiments are defined by the dependent claims.

The method according to the present invention for allocating and de-allocating uplink base station processing resources to a mobile terminal, wherein the mobile terminal and the base station are adapted to communicate on an uplink channel supporting macro-diversity, and the base station is a non-serving base-station without control of the transmission resource allocation to the mobile-terminal, comprising the steps of predicting a likelihood of successful decoding of a future transmission, and allocating or de-allocating processing resources based on said prediction, makes it possible to allocate base station processing resources for a mobile terminal in the uplink direction when the radio base station is not aware of the granted transmission resources of that mobile terminal.

The base station according to the present invention for allocating and de-allocating uplink base station processing resources to a mobile terminal, wherein the base station are adapted to communicate to a mobile terminal on an uplink channel supporting macro-diversity, and the base station is adapted to be a non-serving base-station without control of the transmission resource allocation to the mobile-terminal, comprising means for predicting a likelihood of successful decoding of a future transmission, and means for allocating or de-allocating processing resources based on said prediction, makes it possible to allocate base station processing resources for a mobile terminal in the uplink direction when the radio base station is not aware of the granted transmission resources of that mobile terminal.

According to an embodiment of the present invention, a prediction of the likelihood of future transmission is also performed.

According to a further embodiment, prediction of the bit rate of a future transmission is performed prior to the allocation and de-allocation and the allocation or de-allocation of processing resources is based on said prediction.

The likelihood of successful decoding may be determined based on a measurement of a received signal strength at the radio base station, on uplink inner loop power control commands, on the mobility of the mobile terminal, or on monitoring the history of successful decoding in the base station. The mobility of the mobile terminal may be determined by doppler measurements. According to one embodiment the prediction of the likelihood for a transmission is based on an analysis of traffic history.

According to further embodiments, the base station processing resources are allocated if the difference of a targeted uplink signal strength and the measured signal strength is less than a defined first threshold and the radio base station processing resources are de-allocated if the difference of a targeted uplink signal strength and the measured signal strength exceeds a defined second threshold.

According to yet further embodiment, the prediction relating to the future transmission or the bit-rate of the future transmission is performed by monitoring scheduling requests from the mobile terminal, monitoring indications of transport formats, monitoring of traffic pattern of the mobile station, or monitoring the network load.

An advantage with the present invention is that the processing resources of Node Bs can reach a high level of utilisation. Node B processing resources are allocated to terminals for which a macro-diversity gain can be expected.

A further advantage is that it results in a less expensive deployment, due to lower requirements on hardware equipment.

A further advantage is that a higher throughput in soft handover is achieved and macro diversity gain in soft handover is achieved also for high bit rates.

BRIEF DESCRIPTION OF THE DRAWINGS

FIG. 3 is a flow chart of the method according to the present invention.

DESCRIPTION OF THE INVENTION

Figure 1:
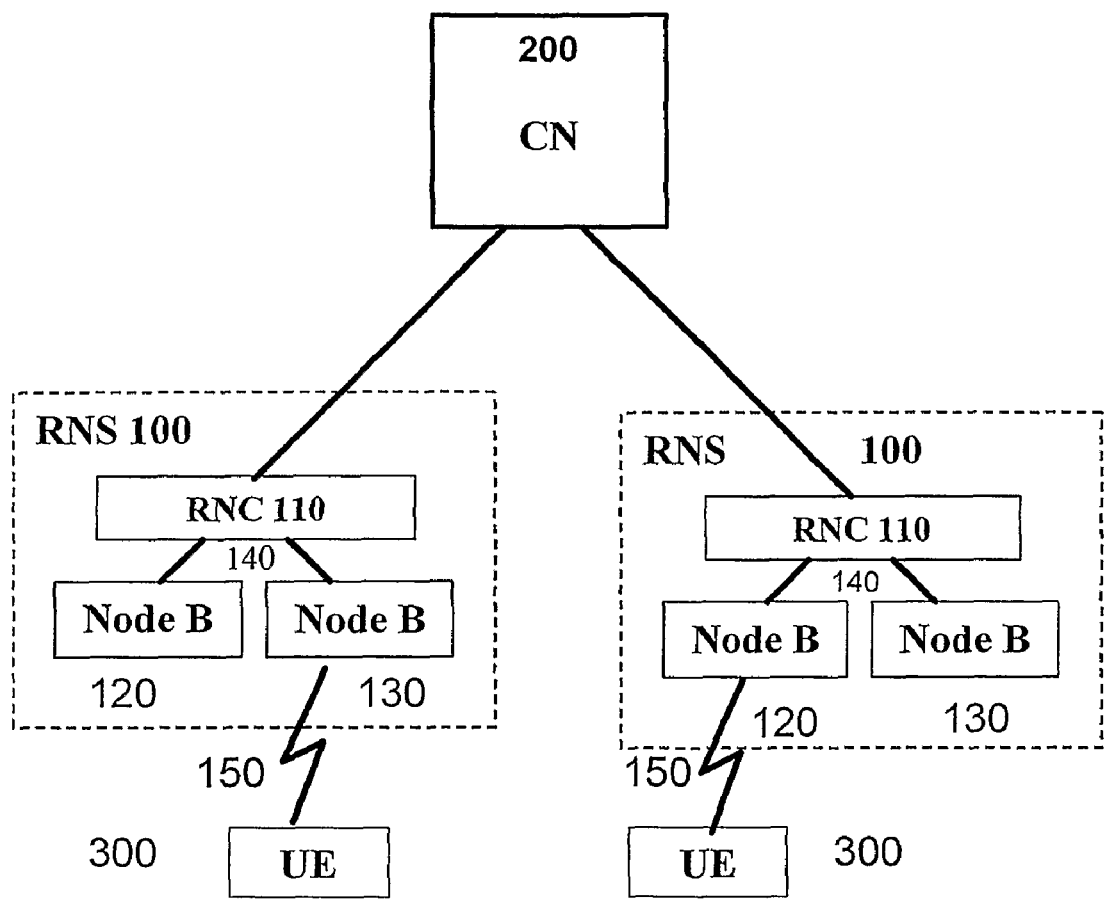
FIG. 1 illustrates a UMTS network wherein the present invention may be implemented.
Figure 2:
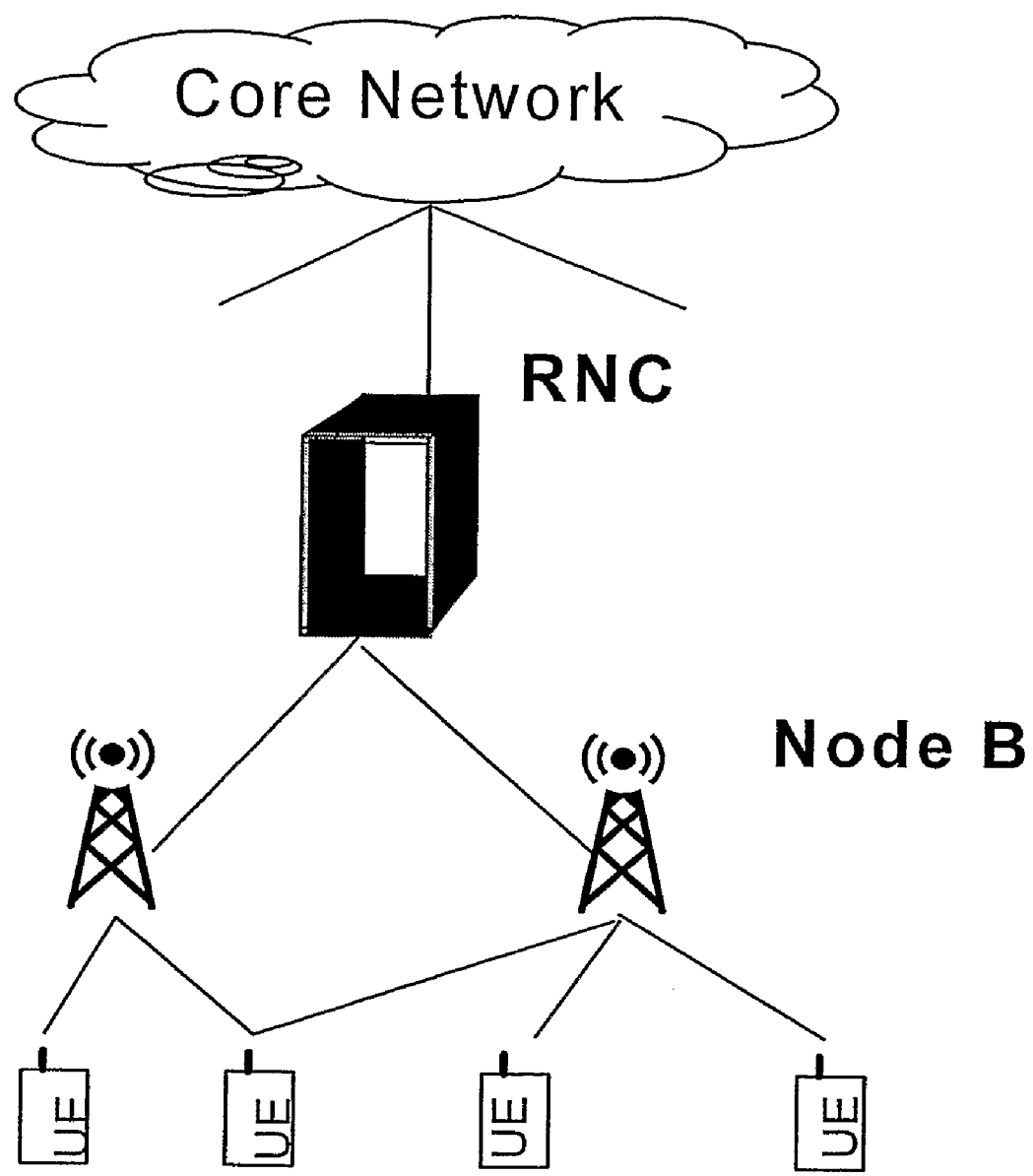
FIG. 2 illustrates soft-handover in a UMTS network.

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The object of the present invention is achieved by a method and a base station in a mobile telecommunication network for allocating and de-allocating uplink base station processing resources to a mobile terminal. The base station are adapted to communicate to a mobile terminal on an uplink channel supporting macro-diversity, and the base station is adapted to be a non-serving base-station without control of the transmission resource allocation to the mobile-terminal, e.g. a non-serving E-DCH Node B. The base station comprises according to the present invention means for predicting a likelihood of successful decoding of a future transmission, and means for allocating or de-allocating processing resources based on said prediction.

Thus, the present invention is based on a prediction of the likelihood that a non-serving base-station without control of the transmission resource allocation to the mobile-terminal will need, and will be able to decode the transmitted data in the situation when the non-serving Node B has close to equal or even better reception possibilities than the serving Node B. Thus this type of predictive Node B processing resource allocation is needed in cases when the likelihood of successful decoding is high at the non-serving Node B. De-allocation of reserved processing resources can be performed when the likelihood of successful decoding is low.

In the described embodiments below, the uplink channel supporting macro-diversity is exemplified with an E-DCH and the non-serving base-station without control of the transmission resource allocation to the mobile-terminal is exemplified with non-serving E-DCH Node B. It should however be noted that other uplink channels supporting macro-diversity and hence other non-serving base stations may be used in the present invention.

The set of cells that carry the E-DCH for one UE, the E-DCH active set, is governed by the RNC. The RNC also decides which cell should be the Serving E-DCH cell. In principle, it would be desirable to always assign the cell with the strongest uplink to the Serving E-DCH Cell. This is simply because the likelihood of successful de-coding is highest in the Node B receiving the strongest uplink signal and the Node B of the serving cell has full control of allocated grants. It should be noted that serving cell is also referred to as serving Node B wherein it should be understood that the serving node B controls the transmission resources of the serving cell.

However, rapid fluctuations in signal propagation and load conditions may result in biased situations, when the uplink signal strength is stronger in a cell not served by the Node B in control of the E-DCH serving cell. Changing the Serving E-DCH cell is a much slower process, meaning the reception quality may occasionally be much better in a cell governed by a non-serving Node B.

In addition, it should be noted that the choice of Serving E-DCH cell may be based on criteria, which are less correlated with the received uplink signal strength. For example, it may be desirable to tie the Serving E-DCH cell to the High Speed Downlink Shared Channel (HS-DSCH) serving cell. In cases when the uplink and downlink propagation and interference/load conditions are different, it could again happen that the uplink reception is better in a cell supported by a Node B not in control of the Serving E-DCH cell.

It is therefore highly desirable to identify situations when the uplink reception quality in a non-serving E-DCH Node B is high, and predictive processing resource allocation of Node B processing resources would be highly desirable. Similarly, it is equally desirable to release Node B processing resources, in cases when it is identified that successful decoding in the Node B would be very unlikely, i.e. that any gain from macro-diversity from this Node B is unlikely. Such released processing resources may preferably be used for other purposes.

Thus, the present invention relates to methods and arrangements for predictive allocation and de-allocation of processing resources in a base station of a network that supports enhanced uplink, i.e. comprises the E-DCH and soft-handover in the uplink. The predictive processing resource allocation and de-allocation is according the present invention based on prediction of the likelihood of successful decoding of a future transmission. The prediction of the likelihood for successful decoding may be based on a received signal strength, e.g. the offset of the measured SIR value to a SIR target of the uplink Dedicated Physical Control Channel (DPCCH), inner-loop power control commands, and/or Doppler measurements. This is further described below.

The outer-loop power control of the uplink is based on a reference Signal-to-Interference-Ratio (SIR) target for the uplink DPCCH channel. This SIR target is distributed from the RNC to all cells in the active set, and each Node B strives to keep the measured SIR at the SIR target. This control is conducted by sending binary ("UP/DOWN") inner loop power control commands (TPC commands) from the Node Bs to the terminal, where these commands demand the terminal either to increase or decrease its transmit power. However, the terminal is allowed to increase its transmission power only if no Node B in the active set is transmitting "DOWN" TPC command.

Since the uplink propagation and interfering load conditions from a terminal to different cells in general are different, it follows that typically only one cell in the active set receives the Dedicated Physical Control Channel (DPCCH) at the targeted SIR level. This cell, and other cells which have the measured SIR close to the SIR target, have the best requisites for successful coding of the uplink. Therefore, Node Bs that govern cells for which the measured SIR is close to the SIR target, should perform predictive allocation of processing resources according to the present invention. One implementation could include an integrator summing up the SIR error during a pre-defined period. If the signal strength e.g. the SIR error is less than a pre-defined value, then processing resources are allocated. If the SIR error exceeds another threshold, then the allocated processing resources are de-allocated.

Thus, the processing resources from the radio base station may be allocated based on the power control commands sent from the radio base-station for governing the terminal transmission power such that, during a monitoring period, the fraction of commands requesting the mobile terminal to decrease its transmission power, exceeds a pre-defined threshold. Accordingly, the processing resources from the radio base station may be de-allocated based on the power control commands sent from the radio base-station for governing the terminal transmission power, such that during a monitoring period, the fraction of commands requesting the terminal to decrease its transmission power remains below a pre-defined threshold.

According another embodiment, the mobility of a terminal is analyzed, because there is a greater likelihood that propagation conditions of a terminal showing high Doppler will change, meaning that the weak cell may suddenly turn into the strongest one. Thus, predictive processing resource allocation according to the present invention of UEs showing high Doppler is desirable.

In a further embodiment of the present invention the likelihood for successful decoding is based on monitoring the history of successful decoding in the radio base station.

According to further aspects of the present invention, the likelihood for successful decoding is dependent on the likelihood of a future transmission. Moreover, the processing resource allocation may also depend on a prediction of the bit-rate of future transmission. Hence the likelihood of a future transmission and the bit-rate of future transmission are predicted according to embodiments of the present invention. The prediction of the likelihood of a future transmission and the bit-rate of future transmission may be based on analysis of Scheduling requests, analysis of traffic pattern (i.e. the de-facto use by the UE, which is constrained both by grants given from the serving cell, and constrained by the UE power) and analysis of cell load. This is further described below.

A different way of identifying the uplink signal strength is to monitor the TPC commands sent from the non-serving Node B. In WCDMA, the binary TPC commands are transmitted with a frequency of 1500 Hz. In case the TPC commands during a monitored period from a non-serving Node B include commands for decreasing ("DOWN") the UE transmission power, it means that the uplink reception quality is relatively good in a cell governed by this Node B. Consequently the Node B should allocate hardware resources in cases when such events are detected. One possibility to quantify this aspect is measure the fraction of "Down"-commands during a defined time-window, and if this fraction exceeds a certain threshold, then processing resources are allocated from this Node B. Similarly, if the measured fraction of "Down" commands is less than another threshold, the allocated processing resources are released.

One way to predict the future transmission rate of the UE may be performed based on passed activity. Thus, the amount of hardware that is needed in a non-serving cell can be predicted. This prediction can be based on e.g. scheduling requests, out-band Transport Format Combination Indications (TFCI) received in passed time, and/or the cell or network load level. Scheduling requests gives "hints" about the transmission demand of the UE, and TFCI provides a possibility to monitor the de-facto UE use constrained both by UE transmission need, UE power and grants from the serving cell and (other) non-serving cells.

The current network load hints of how much processing resources a single UE may be allocated. In a highly loaded net, each user will typically not receive very large grants. However, in an empty net, a single UE may ramp up to considerable high bit-rates rather quickly.

This is further illustrated by the following example. Assume a network deployment and a management of the cells, such that a UE is in SoHo in 30% of the network area.

Assume for simplicity, that each UE is having two cells in its active set, where the two cells are governed by different Node Bs. One of the two links for each UE is assumed to be stronger than the other. Of 100 UEs in a network, 30 users may be in Soft Handover creating a total of 130 radio links in the uplink to serve these UEs (70 for UEs in non-Soft handover, and 2*30 for UEs in Soft Handover).

First is the likelihood of successful decoding considered: Suppose that the peak-allocation of hardware for a single link takes one resource unit. Without the present invention, the base stations must allocate 130 resource units. Regarding the likelihood of successful decoding, only 100 resource units need to be allocated, since the hardware is ideally only allocated to the base station controlling the strongest link. Thus, in this example, the reduction in processing resource need for peak-allocation is 23%. [NOTE: The relative savings can be much higher, since the base station would typically not peak-allocate processing resources for its served UEs, i.e. the 100 radio links that are fully controlled by the Serving Node B.]

Secondly is the likelihood and bit-rate of future transmission considered: Hardware constraints typically occur when the network is loaded and the uplinks are strictly rate-controlled. By performing hardware allocation as a function of the UE and network load, it can be expected that an additional reduction of hardware need (relative to the conservative peak-allocation strategy above) could be in the order of 50-60%.

The present invention also relates to a method in a base station of a mobile telecommunication network for allocating and de-allocating uplink base station processing resources to a mobile terminal, wherein the mobile terminal and the base station are adapted to communicate on an uplink channel supporting macro-diversity, and the base station is a non-serving base-station without control of the transmission resource allocation to the mobile-terminal. The method is illustrated by the flow chart in FIG. 3. The method comprises the steps:

301. Predict a likelihood of successful decoding of a future transmission.

302. Allocate or de-allocate processing resources based on said prediction.

The method may be implemented by a computer program product. Such a computer program product may be directly loadable into a processing means in a computer in a base station, comprising the software code means for performing the steps of the method.

The computer program product may be stored on a computer usable medium, comprising readable program for causing a processing means in a computer within a base station, to control the execution of the steps of the method. Although the description focuses on 3G, Enhanced Uplink, the present invention can be generally applicable to other systems supporting macro-diversity in the uplink.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A method in a non-serving base station of a mobile telecommunication network for allocating and de-allocating uplink base station processing resources to a mobile terminal as part of supporting soft handover in the network, wherein the mobile terminal and the non-serving base station are adapted to communicate on an uplink channel supporting macro-diversity, and wherein the non-serving base station has no control of the transmission resource allocation to the mobile terminal, the method comprises performing the following steps using the non-serving base station:

predicting a likelihood of successful decoding of a future transmission from the mobile terminal to the non-serving base station; and, based on said prediction, allocating or de-allocating processing resources of the non-serving base station for the mobile terminal.

2. The method according to claim 1, wherein the predicting step comprises the further step of:
predicting the likelihood of future transmission from the mobile terminal.

3. The method according to claim 1, wherein the allocating or de-allocating step is preceded by the steps of:
the non-serving base station predicting the bit rate of said future transmission; and,
the non-serving base station allocating or de-allocating processing resources based on said prediction.

4. The method according to claim 1, wherein the likelihood of successful decoding is determined based on a measurement of a received signal strength at the non-serving base station.

5. The method according to claim 1, wherein the likelihood of successful decoding is determined based on uplink inner loop power control commands.

6. The method according to claim 5, wherein processing resources of the non-serving base station are allocated/de-allocated if the fraction of power control commands requesting the mobile terminal to decrease its transmission power, during a monitoring period, exceeds/remains below a pre-defined threshold.

7. The method according to claim 1, wherein the likelihood of successful decoding is determined based on the mobility of the mobile terminal.

8. The method according to claim 7, wherein the mobility of the mobile terminal is determined by doppler measurements.

9. The method according to claim 1, wherein the likelihood of successful decoding is determined based on monitoring the history of successful decoding in the non-serving base station.

10. The method according to claim 2, wherein the prediction of the likelihood for a transmission is based on an analysis of traffic history.

11. The method according to claim 4, wherein the processing resources of the non-serving base station are allocated if the difference of a targeted uplink signal strength and the measured signal strength is less than a defined threshold.

12. The method according to claim 4, wherein the processing resources of the non-serving base station are de-allocated if the difference of a targeted uplink signal strength and the measured signal strength exceeds a defined threshold.

13. The method according to claim 2, wherein the prediction relating to the future transmission or the bit-rate of the future transmission comprises the step of:
monitoring scheduling requests from the mobile terminal.

14. The method according to claim 2, wherein the prediction relating to the future transmission or the bit-rate of the future transmission comprises the step of:
monitoring indications of transport formats.

15. The method according to claim 2, wherein the prediction relating to the future transmission or the bit-rate of the future transmission comprises the step of:
monitoring of traffic pattern of the mobile terminal.

16. The method according to claim 2, wherein the prediction relating to the future transmission or the bit-rate of the future transmission comprises the step of:
monitoring the network load.

17. A non-serving base station in a mobile telecommunication network for allocating and de-allocating uplink base station processing resources to a mobile terminal as part of supporting soft handover in the network, wherein the non-serving base station is adapted to communicate to the mobile terminal on an uplink channel supporting macro-diversity, and wherein the non-serving base station has no control of the transmission resource allocation to the mobile-terminal, the non-serving base station is configured to perform the following:
predict a likelihood of successful decoding of a future transmission from the mobile terminal to the non-serving base station; and,
based on said prediction, allocate or de-allocate processing resources of the non-serving base station for the mobile terminal.

18. The non-serving base station according to claim 17, further configured to predict the likelihood of future transmission from the mobile terminal.

19. The non-serving base station according to claim 17, further configured to predict the bit rate of said future transmission and allocate or de-allocate processing resources based on said prediction.

20. The non-serving base station according to claim 17, further configured to determine likelihood of successful decoding by measuring a received signal strength at the non-serving base station.

21. The non-serving base station according to claim 17, wherein the likelihood of successful decoding is determined based on uplink inner loop power control commands.

22. The non-serving base station according to claim 21, further configured to allocate or de-allocate processing resources thereof if the fraction of power control commands requesting the mobile terminal to decrease its transmission power, during a monitoring period, exceeds/remains below a pre-defined threshold.

23. The non-serving base station according to claim 17, wherein the likelihood of successful decoding is determined based on the mobility of the mobile terminal.

24. The non-serving base station according to claim 23, wherein the mobility of the mobile terminal is determined by doppler measurements.

25. The non-serving base station according to claim 17, wherein the likelihood of successful decoding is determined based on monitoring the history of successful decoding in the non-serving base station.

26. The non-serving base station according to claim 18, wherein the prediction of the likelihood for a transmission is based on an analysis of traffic history.

27. The non-serving base station according to claim 20, wherein the non-serving base station is configured to allocate processing resources thereof if the difference of a targeted uplink signal strength and the measured signal strength is less than a defined threshold.

28. The non-serving base station according to claim 20, wherein the non-serving base station is configured to de-allocate processing resources thereof if the difference of a targeted uplink signal strength and the measured signal strength exceeds a defined threshold.

29. The non-serving base station according to claim 18, further configured to monitor scheduling requests from the mobile terminal.

30. The non-serving base station according to claim 18, further configured to monitor indications of transport formats.

31. The non-serving base station according to claim 18, further configured to monitor traffic pattern of the mobile terminal.

32. The non-serving base station according to claim 18, further configured to monitor the network load.

* * * * *

UNITED STATES PATENT AND TRADEMARK OFFICE
CERTIFICATE OF CORRECTION

| | | |
|---|---|---|
| PATENT NO. | : 8,254,936 B2 | Page 1 of 1 |
| APPLICATION NO. | : 12/091954 | |
| DATED | : August 28, 2012 | |
| INVENTOR(S) | : Torsner et al. | |

It is certified that error appears in the above-identified patent and that said Letters Patent is hereby corrected as shown below:

On the Face Page, in Field (75), under "Inventors", in Column 1, Line 3, delete "Parkval," and insert -- Parkvall, --, therefor.

In Column 1, Line 61, delete "that" and insert -- that is --, therefor.

Signed and Sealed this
Fifth Day of February, 2013

Teresa Stanek Rea
*Acting Director of the United States Patent and Trademark Office*